United States Patent
Heffez

(10) Patent No.: US 8,640,197 B2
(45) Date of Patent: Jan. 28, 2014

(54) METHODS FOR ACQUIRING AN INTERNET USER'S CONSENT TO BE LOCATED AND FOR AUTHENTICATING THE IDENTITY OF THE USER USING LOCATION INFORMATION

(76) Inventor: Guy Heffez, New York, NY (US)

(*) Notice: Subject to any disclaimer, the term of this patent is extended or adjusted under 35 U.S.C. 154(b) by 54 days.

(21) Appl. No.: 13/065,691

(22) Filed: Mar. 28, 2011

(65) Prior Publication Data

US 2011/0239274 A1 Sep. 29, 2011

Related U.S. Application Data

(63) Continuation-in-part of application No. 12/357,380, filed on Jan. 1, 2009, which is a continuation-in-part of application No. 11/405,789, filed on Apr. 18, 2006, application No. 13/065,691, which is a continuation-in-part of application No. 12/260,065, filed on Oct. 28, 2008, now abandoned, which is a continuation-in-part of application No. 11/346,240, filed on Feb. 3, 2006, now Pat. No. 7,503,489, application No. 13/065,691, which is a continuation-in-part of application No. 12/600,808, filed as application No. PCT/US2007/012552 on May 29, 2007.

(60) Provisional application No. 61/445,860, filed on Feb. 23, 2011, provisional application No. 61/318,329, filed on Mar. 28, 2010, provisional application No. 60/711,346, filed on Aug. 25, 2005, provisional application No. 60/674,709, filed on Apr. 26, 2005.

(51) Int. Cl.
*G06F 7/04* (2006.01)

(52) U.S. Cl.
USPC ...... 726/2; 726/3; 705/35; 705/37; 455/456.1

(58) Field of Classification Search
USPC ............................................................ 726/2
See application file for complete search history.

(56) References Cited

U.S. PATENT DOCUMENTS

| | | | |
|---|---|---|---|
| 6,012,144 A | 1/2000 | Pickett | |
| 6,097,938 A | 8/2000 | Paxson | |
| 6,466,779 B1 | 10/2002 | Moles | |
| 6,882,313 B1 | 4/2005 | Fan | |
| 7,200,673 B1 | 4/2007 | Augart | |
| 7,376,431 B2 | 5/2008 | Niedermeyer | |
| 7,503,489 B2 | 3/2009 | Heffez | |
| 7,647,164 B2* | 1/2010 | Reeves | 701/516 |
| 7,788,134 B1* | 8/2010 | Manber et al. | 705/26.1 |
| 2001/0034718 A1 | 10/2001 | Shaked | |
| 2002/0016831 A1 | 2/2002 | Peled | |

(Continued)

FOREIGN PATENT DOCUMENTS

| | | |
|---|---|---|
| GB | 2383497 A1 | 6/2003 |
| WO | WO-2004079499 A2 | 9/2004 |

*Primary Examiner* — Linglan Edwards
*Assistant Examiner* — Gary Gracia
(74) *Attorney, Agent, or Firm* — James P. Demers; Gotham Patent Services LLC

(57) ABSTRACT

A method and system for acquiring an Internet user's consent to be geographically located via at least two independent sources of geographical information while at least one independent source of geographical information is the wireless location of said Internet user's communication voice device. The method does not require any user intervention other than the user's interaction with an Internet site via the Internet user's Internet browser.

21 Claims, 5 Drawing Sheets

(56) References Cited

U.S. PATENT DOCUMENTS

| | | |
|---|---|---|
| 2002/0019699 A1 | 2/2002 | McCarty |
| 2002/0053018 A1 | 5/2002 | Ota |
| 2002/0089960 A1 | 7/2002 | Shuster |
| 2002/0107027 A1* | 8/2002 | O'Neil .................... 455/456 |
| 2002/0188712 A1 | 12/2002 | Caslin |
| 2003/0009594 A1 | 1/2003 | McElligott |
| 2003/0056096 A1 | 3/2003 | Albert |
| 2003/0061114 A1* | 3/2003 | Schwartz et al. ............ 705/26 |
| 2003/0101134 A1 | 5/2003 | Liu |
| 2003/0134648 A1 | 7/2003 | Reed |
| 2003/0187800 A1 | 10/2003 | Moore |
| 2004/0073519 A1 | 4/2004 | Fast |
| 2004/0081109 A1 | 4/2004 | Oishi |
| 2004/0088551 A1 | 5/2004 | Dor |
| 2004/0111640 A1 | 6/2004 | Baum |
| 2004/0219904 A1 | 11/2004 | DePetris |
| 2004/0234117 A1 | 11/2004 | Tibor |
| 2004/0242201 A1 | 12/2004 | Sasakura |
| 2004/0254868 A1 | 12/2004 | Kirkland |
| 2004/0259572 A1 | 12/2004 | Aoki |
| 2004/0262381 A1* | 12/2004 | Mesaros .................... 235/380 |
| 2005/0021738 A1 | 1/2005 | Goeller |
| 2005/0022119 A1 | 1/2005 | Kraemer |
| 2005/0159173 A1 | 7/2005 | Dowling |
| 2005/0160280 A1 | 7/2005 | Caslin |
| 2005/0180395 A1 | 8/2005 | Moore |
| 2005/0181807 A1* | 8/2005 | Dowling et al. ............ 455/456.1 |
| 2005/0251326 A1* | 11/2005 | Reeves .................... 701/200 |
| 2005/0260973 A1* | 11/2005 | van de Groenendaal ...... 455/411 |
| 2006/0030339 A1* | 2/2006 | Zhovnirovsky et al. ... 455/456.6 |
| 2006/0059003 A1* | 3/2006 | Requena et al. ............ 705/1 |
| 2006/0085310 A1* | 4/2006 | Mylet et al. ................. 705/35 |
| 2006/0085357 A1 | 4/2006 | Pizarro |
| 2006/0100951 A1* | 5/2006 | Mylet et al. ................. 705/37 |
| 2006/0107307 A1 | 5/2006 | Knox |
| 2006/0128397 A1 | 6/2006 | Choti |
| 2006/0168123 A1* | 7/2006 | Krstulich .................... 709/219 |
| 2006/0194592 A1 | 8/2006 | Clough |
| 2006/0246918 A1* | 11/2006 | Fok et al. .................. 455/456.1 |
| 2006/0277312 A1 | 12/2006 | Hirsch |
| 2007/0208934 A1 | 9/2007 | Heffez |
| 2008/0222038 A1 | 9/2008 | Eden |
| 2008/0268870 A1* | 10/2008 | Houri .................... 455/456.1 |
| 2009/0102712 A1 | 4/2009 | Heffez |
| 2009/0206157 A1 | 8/2009 | Heffez |
| 2009/0222891 A1 | 9/2009 | Heffez |
| 2010/0153733 A1 | 6/2010 | Heffez |

* cited by examiner

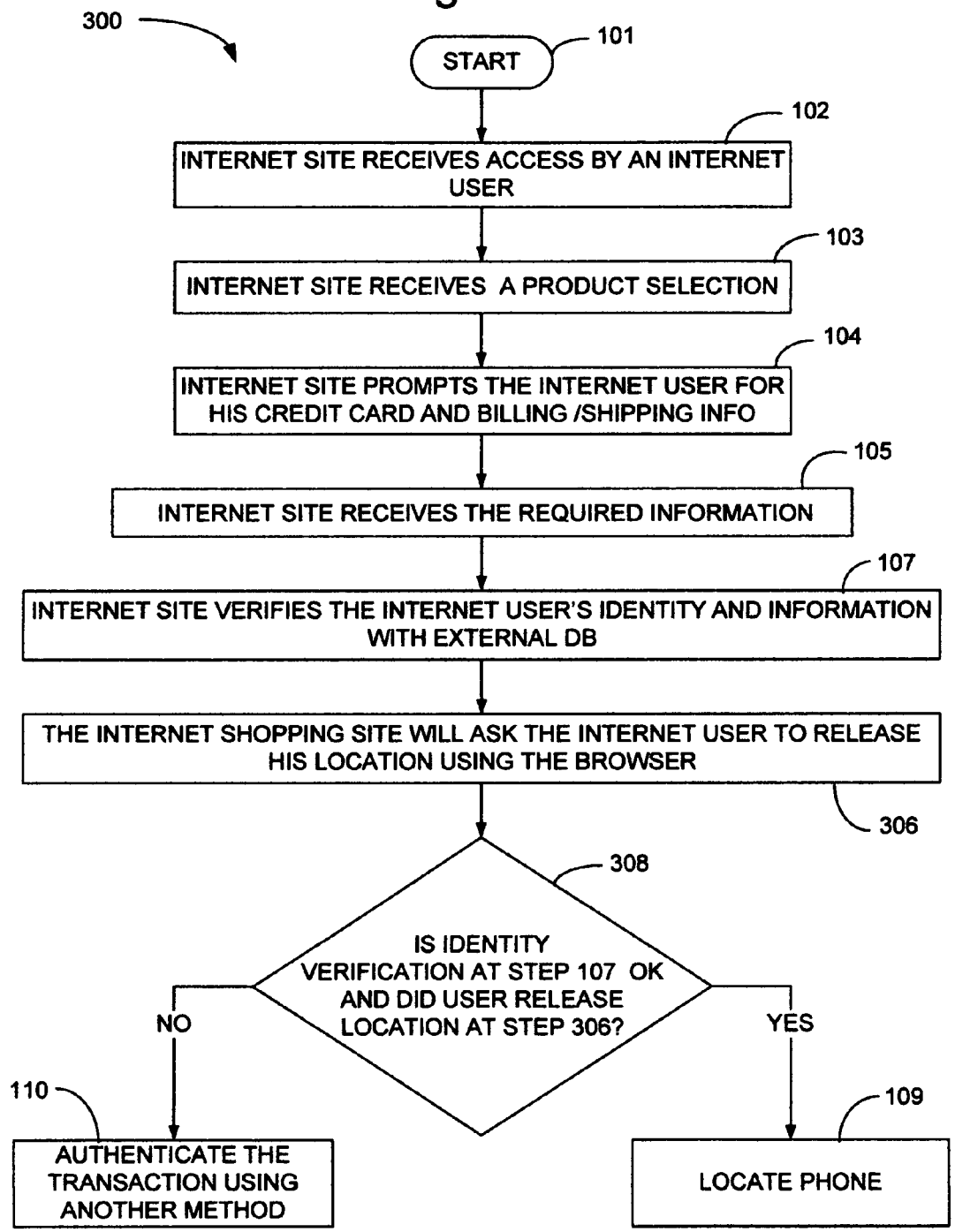

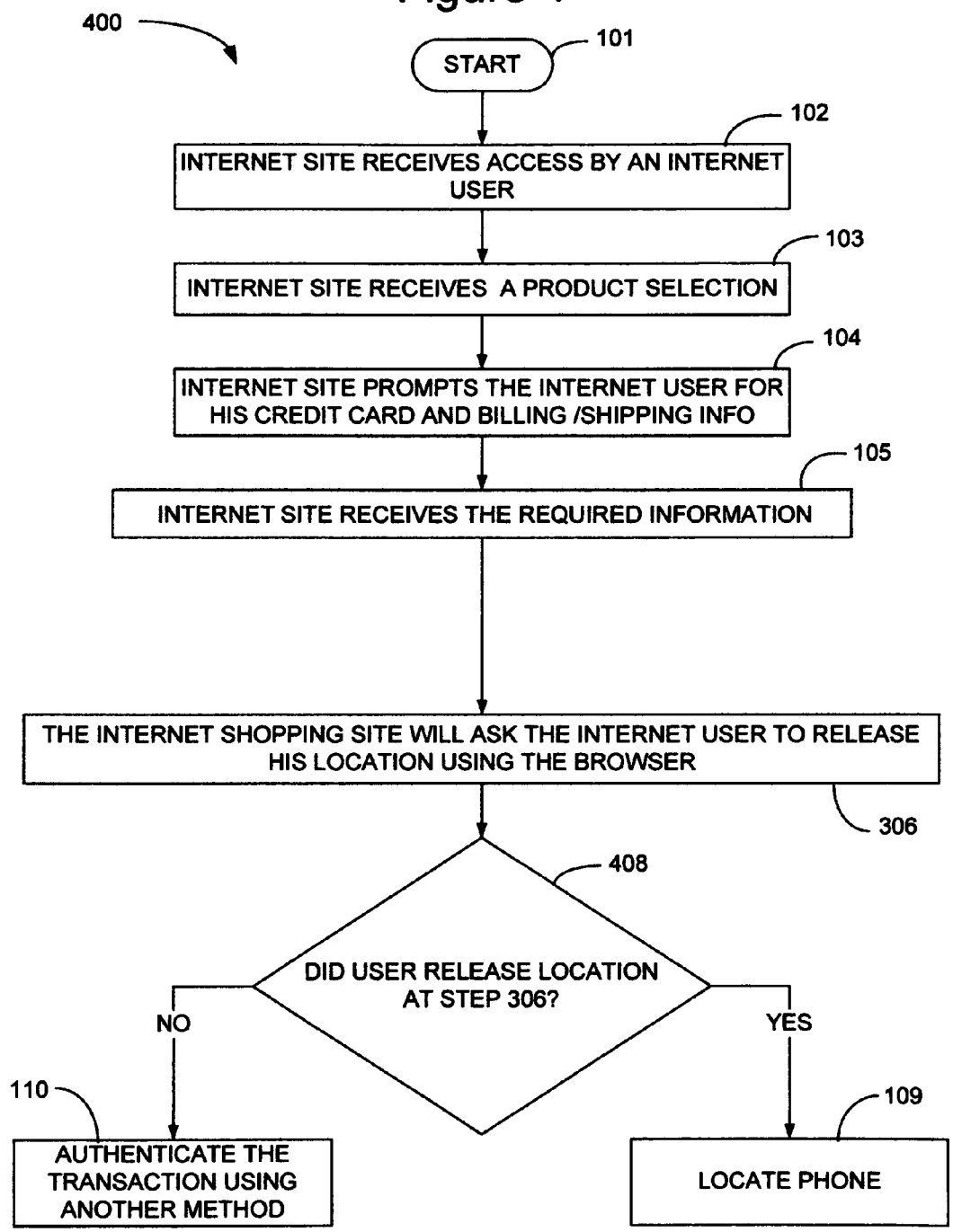

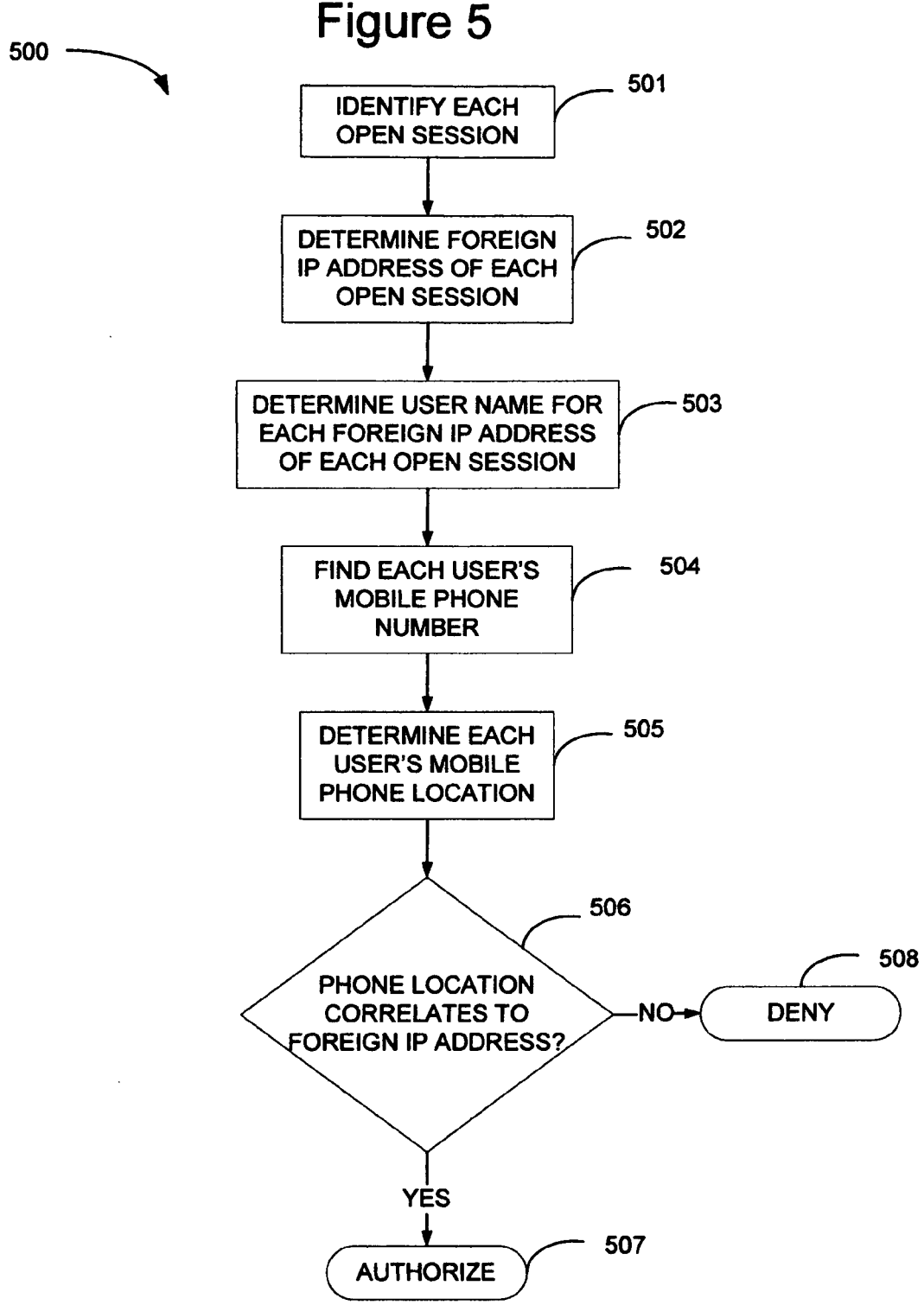

METHODS FOR ACQUIRING AN INTERNET USER'S CONSENT TO BE LOCATED AND FOR AUTHENTICATING THE IDENTITY OF THE USER USING LOCATION INFORMATION

RELATED APPLICATIONS

This application claims priority of U.S. provisional application No. 61/445,860 filed on Feb. 23, 2011 and U.S. provisional application No. 61/318,329 filed on Mar. 28, 2010.

This is a continuation-in-part of pending U.S. patent application Ser. No. 12/357,380, filed Jan. 1, 2009, which is a continuation-in-part of Ser. No. 11/405,789 filed Apr. 18, 2006, which claims the benefit of provisional application No. 60/711,346 filed on Aug. 25, 2005. The contents of these prior applications are incorporated herein by reference in their entirety.

This is also a continuation-in-part of U.S. patent application Ser. No. 12/260,065 filed Oct. 28, 2008 now abandoned, which is a continuation-in-part of Ser. No. 11/346,240 filed Feb. 3, 2006 now U.S. Pat. No. 7,503,489, claiming priority of provisional application No. 60/674,709 filed Apr. 26, 2005, and issued as U.S. Pat. No. 7,503,489.

This is also a continuation-in-part of pending U.S. patent application Ser. No. 12/600,808 filed Nov. 18, 2009 as a national stage application of PCT/US07/12552 filed May 29, 2007. The present application incorporates herein by reference the entire disclosure of U.S. patent application Ser. No. 12/600,808.

TECHNICAL FIELD

The invention relates to the geographic location (geolocation) of Internet users, and to the authentication of the identity of Internet users in connection with access to computer systems, servers, and web sites, and authorization of transactions.

BACKGROUND OF THE INVENTION

The use of the Internet has become a common a popular arena for the sale of goods and services. Such sales require the transmission of personal and confidential data belonging to the buyer of such goods and services. Such information is often the target of identity theft. In response to the increase in the opportunity for the commission of fraud through identity theft, sellers and providers of goods and services through the Internet require a method whereby such fraud can be reduced.

It is preferred to keep the Internet user's experience simple while the Internet user is shopping online or accessing their online bank account. On the other hand, the Internet fraud causes online banks and ecommerce providers to lose significant amounts of money to fraudulent transactions. In addition, for privacy reasons, it is preferable to acquire the Internet user's consent before locating the Internet user's wireless geographical location. Therefore, it is preferable to be able to authenticate the Internet user automatically without user intervention or with very little user intervention.

Present technologies that authenticate the Internet user or acquire the Internet user's consent to be located are using 'Out Of Band' technologies that require user intervention and involve at least one action with a communication voice device. For example, in a method referred to as phone authentication, when a transaction is initiated over the Internet, an automated phone call or text message can be sent to the user's registered phone number. The user is asked to verify the specific transaction, for example via the following hypothetical text or voice dialogue:

"This is phone verification calling to verify the transfer of $10,000 to account 77356 at Bank Of Canada. Please click '1' to approve or click '2' to talk with our representative."

If the transaction is valid, the user presses "1" or replies to the text message to approve the transaction. If the user does not answer the call or respond to the text message with "2", the transaction is denied or flagged for further review. In addition, the user can report fraudulent transactions by entering "2" during the call or in the text message reply. This locks the account and sends an alert to the bank's anti-fraud team.

Internet commerce is not the only activity where methods for user authentication are desirable. Owners of Internet web sites, web hosts, and other proprietors of Internet-accessible computer systems and servers usually wish to limit access to authorized users.

With respect to Internet usage, upon accessing the Internet, an Internet user's computer is identified with an IP address, a numeric identifier formatted according to the Internet protocol in use at the time. Whenever an Internet user enters a Internet site, the Internet user's IP address is identified to the Internet site owner. In parent applications to the present invention, the present inventor has described systems in which such an identified IP address can be traceable geographically to its source so as to determine the location (state and city) of the Internet user; in some cases the IP address can be traced to within a radius of a few miles from its source. The comparison of the geographical location of the Internet user IP address, with the geographical location of said Internet user communication voice device can provide the seller or provider a means to authenticate the identity of the Internet user.

U.S. patent application Pub. No. 2001/0034718 of Shaked et al. discloses a method of controlling access to a service over a network, including the steps of automatically identifying a service user and acquiring user information, thereby to control access. Additionally, a method of providing service over a network, in which the service requires identification of a user, including the steps of automatically identifying the user and associating the user with user information, thus enabling the service, is disclosed.

U.S. Pat. No. 6,466,779 to Moles et al. discloses a security apparatus for use in a wireless network including base stations communicating with mobile stations for preventing unprovisioned mobile stations from accessing an Internet protocol (IP) data network via the wireless network.

U.S. patent application Pub. No. 2002/0188712 of Caslin et al. discloses a fraud monitoring system for a communications system. The fraud monitoring system analyzes records of usage activity in the system and applies fraud pattern detection algorithms to detect patterns indicative of fraud. The fraud monitoring system accommodates both transaction records resulting from control of a packet-switched network and those from a circuit-switched network gateway.

U.S. patent application Pub. No. 2003/0056096 of Albert et al. discloses a method to securely authenticate user credentials. The method includes encrypting a user credential with a public key at an access device. The public key is part of a public/private key pair suitable for use with encryption algorithm. The decrypted user credential is then transmitted from the decryption server to an authentication server for verification. The decryption server typically forms part of a multi-party service access environment including a plurality of access providers. This method can be used in legacy protocols, such as Point-to-Point Protocol (PPP), Password Authentication Protocol (PAP), Challenge-Handshake Authentication Protocol (CHAP), Remote Authentication Dial in User Server (RADIUS) protocol, Terminal Access Controller Access Control System (TACAS) protocol, Lightweight Directory Access Protocol (LDAP), NT Domain authentication protocol, Unix password authentication protocol, Hypertext Transfer Protocol (HTTP), Hypertext Transfer Protocol over Secure sockets layer (HTTPS), Extended Authentication Protocol (EAP), Transport Layer Security (TLS) protocol, Token Ring protocol, and/or Secure Remote Password protocol (SRP).

U.S. patent application Publication Number US 2003/0101134 of Liu et al. teaches a method for transaction approval, including submitting a transaction approval request from a transaction site to a clearing agency; submitting a user authorization request from the clearing agency to a user device; receiving a response to the user authorization request; and sending a response to the transaction approval request from the clearing agency to the transaction site. Another method for transaction approval includes: submitting a transaction approval request from a transaction site to a clearing agency; determining whether a trusted transaction is elected; submitting a user authorization request from the clearing agency to a user device if a trusted transaction is determined to be elected; receiving a response to the user authorization request from the user device if the user authentication request was submitted; and sending a response to the transaction approval request from the clearing agency to the transaction site. A system for transaction approval includes a clearing agency for the transaction approval wherein the clearing agency having a function to request for user authorization, a network operatively coupled to the clearing agency, and a user device adapted to be operatively coupled to the network for trusted transaction approval.

U.S. patent application Publication Number US 2003/0187800 of Moore et al. teaches systems, methods, and program products for determining billable usage of a communications system wherein services are provided via instant communications. In some embodiments, there is provision for authorizing the fulfillment of service requests based upon information pertaining to a billable account.

U.S. patent application Publication Number US 2004/0111640 of Baum teaches methods and apparatus for determining, in a reliable manner, a port, physical location, and/or device identifier, such as a MAC address, associated with a device using an IP address and for using such information, e.g., to support one or more security applications. Supported security applications include restricting access to services based on the location of a device seeking access to a service, determining the location of stolen devices, and authenticating the location of the source of a message or other IP signal, e.g., to determine if a user is contacting a monitoring service from a predetermined location.

U.S. patent application Publication Number US 2005/0159173 of Dowling teaches methods, apparatus, and business techniques for use in mobile network communication systems. A mobile unit, such as a smart phone, is preferably equipped with a wireless local area network connection and a wireless wide area network connection. The local area network connection is used to establish a position-dependent, e-commerce network connection with a wireless peripheral supplied by a vendor. The mobile unit is then temporarily augmented with the added peripheral services supplied by the negotiated wireless peripheral. Systems and methods allow the mobile unit to communicate securely with a remote server, even when the negotiated wireless peripheral is not fully trusted. Also included are mobile units, wireless user peripherals, and negotiated wireless peripherals projecting a non-area constrained user interface image on a display surface.

U.S. patent application Publication Number US 2005/0160280 of Caslin et al. teaches providing fraud detection in support of data communication services. A usage pattern associated with a particular account for remote access to a data network is monitored. The usage pattern is compared with a reference pattern specified for the account. A fraud alert is selectively generated based on the comparison.

U.S. patent application Publication Number US 2005/0180395 of Moore et al. teaches an approach for supporting a plurality of communication modes through universal identification. A core identifier is generated for uniquely identifying a user among a plurality of users within the communication system. One or more specific identifiers are derived based upon the core identifier. The specific identifiers serve as addressing information to the respective communication modes. The specific identifiers and the core identifier are designated as a suite of identifiers allocated to the user.

While these systems may be suitable for the particular purpose employed, or for general use, there remains a need for methods of user identification and authentication on computer networks.

SUMMARY OF THE INVENTION

It is an object of the invention to acquire the Internet user's consent over the Internet to be geographically located via at least two separate and independent sources of information while at least one independent source of information is the wireless location of the Internet user's communication voice device. The invention will verify the Internet user's identity from at least two independent sources of information related to the Internet user while at least one of the independent sources is the user's communication voice device wireless location and the user's interaction is only with the Internet site.

It is another object of the invention to acquire, via one single user click using the Internet user's browser, the Internet user's consent to be geographically located, and to be authenticated via at least two separate and independent sources of information while at least one independent source of information is the Internet user's communication voice device wireless geographical location.

It is an object of the invention to acquire the Internet user's consent, over the Internet user's browser, to be geographically located via at least two separate and independent sources of information while at least one independent source of information is the wireless location of the Internet user's communication voice device. The proposed invention will verify the Internet user's identity from at least two independent sources of information related to the Internet user where at least one source of independent information is the user's communication voice device wireless location and where the user's interaction is only with the browser and one communication voice device.

It is another object of the invention to acquire a communication voice device user's single consent, via a single interaction with the communication voice device (a button press or mouse click), to be geographically located via at least two sources of geographical information where at least one source of information is the wireless location of said communication voice device user. Accordingly, this method receives the consent of a communication voice device user or the Internet user, which is the same user to be geographically located and for authenticating the identity of the Internet user.

It is another object of the invention to produce a means to decrease the Internet user's intervention with the communication voice device while authenticating the Internet user and to identify said Internet user from at least two independent sources of information.

A further objective of this invention is to acquire an Internet user's consent, via one communication voice device, to be geographically located via wireless technology using a second communication voice device without any user interaction with the second communication voice device. The first and second communication voice device can be the same communication voice device or two separate communication voice devices. In addition, the first and second sources of information can be of the same communication voice device or two separate communication voice devices.

It is another object of the invention to provide a means for providing an accurate geographical location of the Internet user and the Internet user's IP address. Accordingly, this method includes identifying the IP address and tracing it geographically using any one of the existing software programs that can trace IP addresses.

It is another object of the invention to provide a convenient means for determining the location of Internet users at both mobile and non-mobile communication voice devices and terminals. Accordingly, this method includes the utilization systems and software that are used to locate the geographical location of people or communication voice devices, such as, but not limited to Global Positioning Systems (GPS), Galileo, WiMAX, WiFi, RFID and external positioning apparatus, such as, but not limited to, cellular base stations and antennas.

It is another object of the invention to provide a convenient means for determining a more accurate geographical location of routers using the Internet user communication voice device's geographical location and the said user IP address.

It is an object and feature of the present invention to provide a monitoring system in place to constantly monitor the existing sessions or connections and flag the connections or sessions automatically after the authentication. It is another object and feature of the present invention to include a cross check of the prospective user's mobile voice device number and location to assist in discriminating between authorized and unauthorized users.

The invention includes a method and system for obtaining the consent of an Internet user and communication voice device user or purchaser (hereinafter "Internet user") to be geo-located and then to authenticate the user through cross-referencing and comparison of at least two independent sources of information, such as, but not limited to, the IP address of the Internet user's computer, geographical location of the Internet user, router geographical location or the geographical location of number of a communication voice device associated with said Internet user.

This invention also includes a method and system for authenticating an Internet user identity by cross-referencing and comparing at least two independent sources of information. A first IP address of an Internet user is identified. The geographical location of the IP address is traced geographically to determine a first location. The geographical address of a communications device of said Internet user is traced to determine a second location. The first and second locations are compared for geographical proximity to confirm the identity of the Internet user. Additionally, depending on the geographical proximity of the first and second location, a positive or negative score may be assigned to the Internet user, and access to the Internet site and the ability to conduct transactions may be allowed or limited based on the assigned score. Alternatively, additional authentication information may be required of the Internet user in order to proceed with the online transaction, or access by the Internet user may be terminated.

This invention is a method and system for getting the communication voice device user's consent to be geographically located using wireless technology with little or no intervention via the mobile phone.

The Internet user can be identified over the Internet by identifying private information known to the Internet user only. Example: credit card information, bank account information, username and password and other private information such as past loans, apartments addresses the Internet user used to live in, past merchandise purchased by the Internet user etc. Online verification of the Internet user's identity may be accomplished by correlating the billing information of the credit card or bank account and the communication voice device owner's information. If the information above matches, it is known that the user that is visiting the business Internet site is also the owner of the communication voice device and, therefore, the user has provided his consent online. At this point we can use that consent to locate the user communication voice device wireless geographical location.

Using the computerized method of the present invention it will be possible to determine which connection is authorized; block unauthorized access, sessions, and connections in real time; report breaches to the security administrator about unauthorized access in real time or near real time; identify files that were uploaded into the server via unauthorized sessions and connections, and possibly remove these files automatically; block IP addresses that try to get unauthorized access into the server; and to identify the attack pattern and learn how to block future attacks using the identified patterns. The computerized method of the present invention will make it possible to identify files that open unauthorized connections from the server into another remote computer, such as viruses and Trojans; identify potential security vulnerability that may allow a hacker to get unauthorized access into the server, and to automatically identify security holes that allow Internet fraudsters and hackers access into the server.

To the accomplishment of the above and related objects, the invention may be embodied in the forms illustrated in the accompanying drawings. It should be appreciated that the drawings are intended to be examples, and are illustrative only. Variations of the illustrated examples are contemplated as being part of the invention, which is limited only by the scope of the claims.

BRIEF DESCRIPTION OF THE DRAWINGS

In the drawings, like elements are depicted by like reference numerals. The drawings are briefly described as follows:

FIG. 3 is a flow chart illustrating a third exemplary method and system for acquiring an Internet user's consent to be located and authenticating said Internet user identity using the Internet user location information, according to an embodiment of the present invention; and FIG. 4 is a flow chart illustrating a fourth exemplary method and system for acquiring an Internet user's consent to be located and authenticating said Internet user identity using the Internet user location information, according to an embodiment of the present invention.

FIG. 5 is a flow chart illustrating a fifth exemplary method and system for authenticating an Internet user by validating the identity of the user via geolocation of the user's home or mobile communication device and IP address.

DETAILED DESCRIPTION OF THE INVENTION

Figure 1:
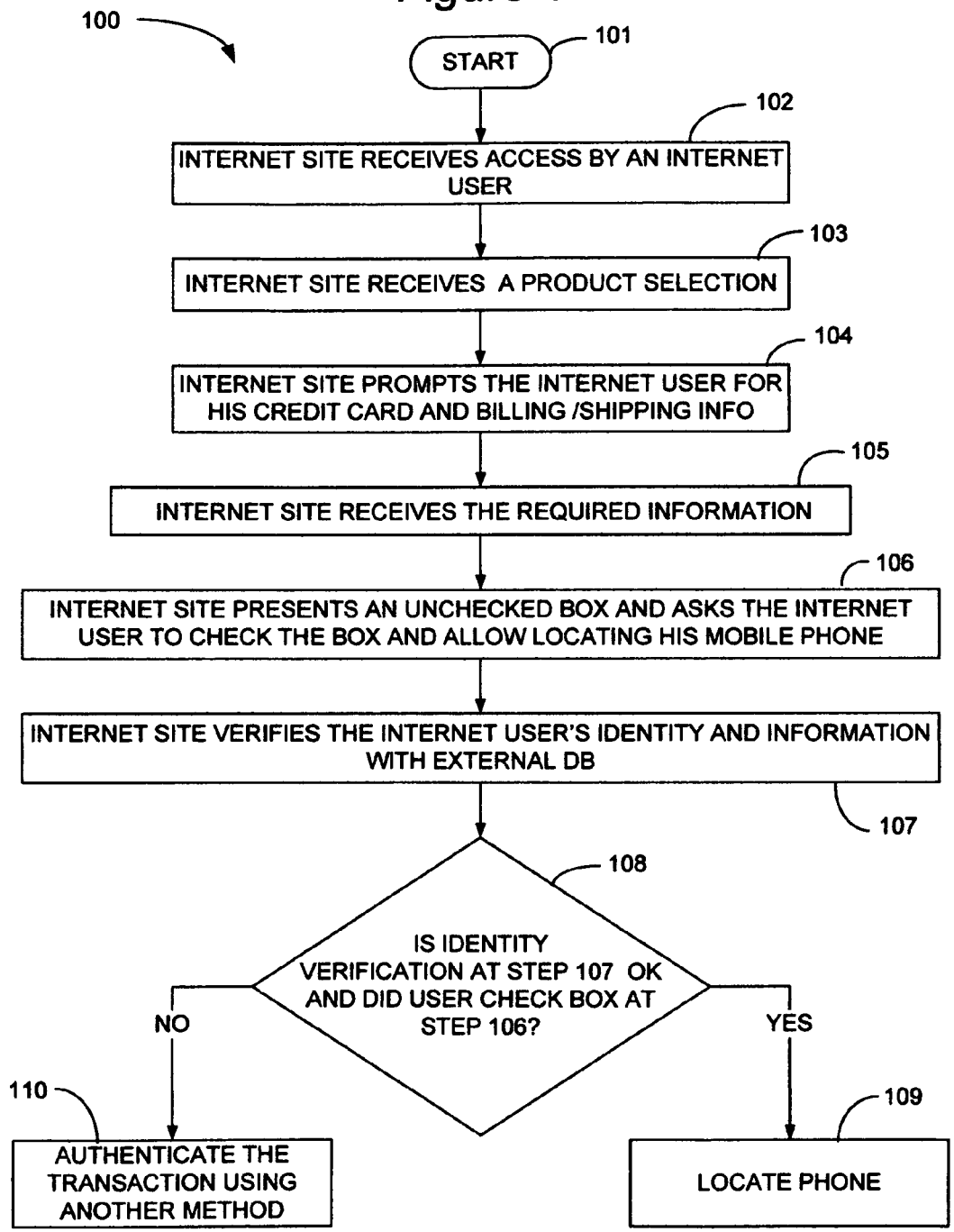
FIG. 1 is a flow chart illustrating the exemplary method and system for acquiring an Internet user's consent to be located and authenticating said Internet user identity using the Internet user location information, according to an embodiment of the present invention.

The term "session" or "connection", as used in the context of the present invention, applies to any communication between two computers, such as, without limitation, the connection, communication, or session that is between client and server in an internal network; the connection, session or communication open between an Internet computer and an Internet server; and the session open by Internet computer to a web site using a browser program, where the web site can be an online bank or an ecommerce site. The term "session" in the present invention is equal to "communication". "Sessions" and "communications" are also the same.

The term "server", as used in the context of the present invention, applies to any device that uses this method, such as, without limitation, any device with an operating system having computing and communication capabilities, such as Windows™, Unix™ and Linux™; installed on any firewall; workstation, laptop, PDA or mobile phone. The method can be implemented on the server to monitor the server's internal activity and can also be implemented on an external device to monitor at least one other different device.

It should be understood that the term "mobile voice phone", as used in the context of the present invention, applies to any mobile device modified or designed for voice or text communication, such as a mobile phone, capable of communicating with another device via wireless networks and associated telecommunication protocols, such as, but not limited to, cellular systems, radio systems, WiFi, WiMAXT™, RFID, Bluetooth™, MIMO, UWB, satellite systems, or any other such wireless network known now or in the future. Other non-limiting examples include any device that has been modified or designed to communicate with a web-ready PDA, a Blackberry™, or a tablet or laptop computer with cellular connect capabilities.

It should be understood that the term "communication voice device", as used in the context of the present invention, applies to any voice device capable of communicating with another voice device such as, but not limited to, phone, mobile voice device, laptop computer, desktop computer, server, VoIP phone or personal digital assistant (hereinafter PDA). Other non-limiting examples include any device that has been modified or designed for voice or text communication.

It should be understood that the term "mobile voice device", as used in the context of the present invention, applies to any mobile device modified or designed for voice or text communication and capable of communicating with another device via wireless network such as but not limited to cellular system, radio system, WiFi, WiMAXT™, RFID, Bluetooth™, MIMO, UWB (Ultra Wide Band), satellite system or any other such wireless networks known now or in the future. Other non-limiting examples include any device that has been modified or designed to communicate with a Internet-ready PDA, a Blackberry, a laptop computer with cellular connect capability, or a notification server, such as email server.

It should be understood that IP Address means an Internet protocol address according to the specifications of any Internet communication protocol, including but not limited to IPV4 and IPV6. "Foreign IP address" refers to an IP address that is assigned to a device not on the local or proprietary network.

It should be understood that where the present description, figures, and claims make reference to the process of "correlating" a location with an IP address, the process comprises comparing the specified location (e.g., the location of a device, home, or office) with a geographical location associated with the specified IP address, and estimating or determining the physical proximity of the two locations.

This invention relates to a method and system for acquiring an Internet user's consent over the Internet to be geographically located via at least two independent sources of wireless information while at least one independent source of wireless information is the Internet user's communication voice device. The proposed method does not require any user intervention outside the user's interaction at the Internet site or with the Internet user's browser.

FIG. 1 is a flow chart illustrating a first exemplary method and system 100 for acquiring an Internet user's consent to be located and authenticating said Internet user identity using the Internet user location information, according to an embodiment of the present invention. The method starts at step 101. At step 102, the Internet site receives data indicating access by an Internet user who is accessing the Internet shopping site (such as www.onlineshoppingsite.com). At step 103, the Internet site receives data indicating that the user has selected a product that the user would like to buy and the user chooses to complete the transaction ("checkout"). At step 104, the Internet site prompts the Internet user for their information (such as their credit card, shipping/billing address and mobile phone number, if it's not on file). At step 105, the Internet site receives the required information such as the billing address, shipping address, credit card information shipping method, etc., that the Internet user has entered. At step 106, the Internet site presents an unchecked checkbox with a prompt such as, "free expedited shipping" and offers to use the Internet user's current mobile phone location to assist in cross-referencing the user's credit card information. The Internet shopping site may present "terms and conditions" describing in detail the implications of checking the box as giving fully informed consent to have geo-location run on the user's cell phone. The preferred action will be for the consumer to "accept" those "terms and conditions." At step 107, the Internet site verifies the consumer's identity via industry external databases (e.g., Experian™, Targus™, etc.) That verification seeks to confirm that the mobile phone owner's information and the credit card/bank account owner's information match such as billing information and name. Alternatively, and a better verification practice than utilizing a third party database provider, is utilizing mobile phone companies' internal databases of billing information. Mobile phone companies already possess the billing information. Unlike third party database providers, mobile phone companies' internal databases add an additional and essential assurance of identity because the billing information already verified by the mobile phone companies during the mobile phone purchase at the mobile phone carrier store using an ID such as driver license, and the subscriber paying their bill sent to that billing address. At step 108, the site may check if (a) the Internet user's identity at step 107 matches the external or internal database, and (b) if the Internet user marked the unchecked box at step 106. If the Internet user checked the checkbox in step 106, and the Internet user's information in step 107 matches the database information, then the Internet site can request the Internet user's phone location 109 and begin authenticating the transaction using the Internet user's location details (mobile phone number/location, computer location such as WiFi. home address or Geo IP, etc.). If the above conditions are not met, the Internet site will use other authentication methods 110.

Figure 2:
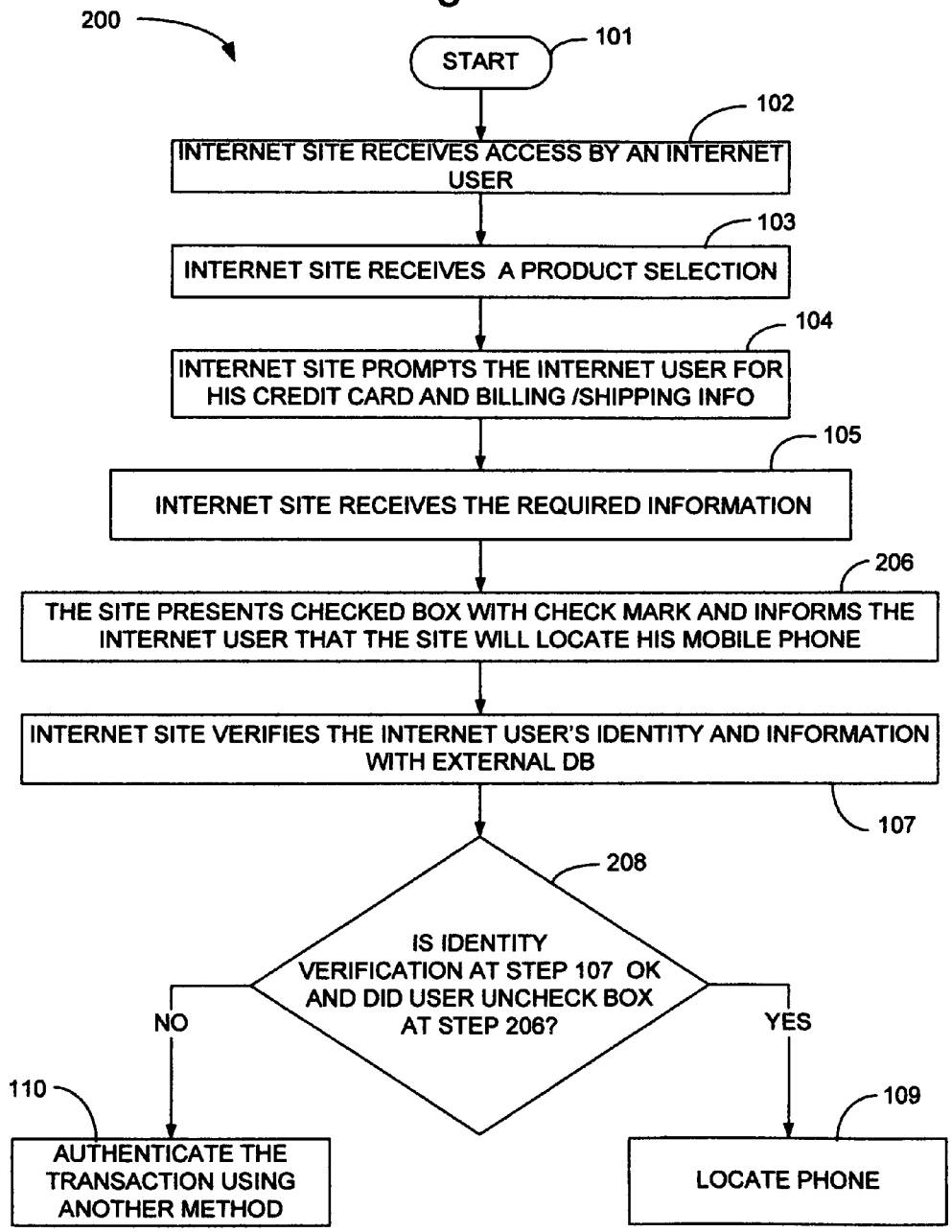
FIG. 2 is a flow chart illustrating a second exemplary method and system for acquiring an Internet user's consent to be located and authenticating said Internet user identity using the Internet user location information, according to an embodiment of the present invention.

FIG. 2 is a flow chart illustrating a second exemplary method and system 200 for acquiring an Internet user's consent to be located and authenticating said Internet user identity using the Internet user location information, according to an embodiment of the present invention. The method starts at step 101 and steps 101 through 105 are the same as for embodiment 100 in FIG. 1. At step 206, the Internet site may present a checked checkbox with a prompt such as, "free expedited shipping—onlineshoppingsite.com will use your current mobile telephone location to protect your credit card information", and will use the Internet user's current mobile phone location to assist in cross-referencing their credit card information. At step 107, the site verifies the Internet user's identity via industry databases (Experian, Targus, 192, etc.) just as in step 107 of embodiment 100 of FIG. 1. That verification seeks to confirm that the mobile phone owner's information and the credit card/bank account owner's information match. At step 208, the site may check if (a) the Internet user's identity at step 107 matches with the external or internal database and (b) if the Internet user did not uncheck the box at step 206. If the Internet user did not unchecked the checked checkbox in step 206, and the Internet user's information in step 107 matches, then the Internet site can request the Internet user's phone location 109 and begin authenticating the transaction using the Internet user's location details (mobile phone number/location, computer location such as WiFi, home address or Geo IP, etc.). This might entail accessing a database that matches a WiFi's unique ID (i.e., identity such as, but not limited to, an Internet media-access-control (MAC) address) with known positions corresponding to each WiFi unique ID. If the above conditions are not met, the site will use other authentication methods 110.

FIG. 3 is a flow chart illustrating the exemplary method and system 300 for acquiring an Internet user's consent to be located and authenticating said Internet user identity using the Internet user location information, according to an embodiment of the present invention. The method starts at step 101 and steps 101 through 105 and 107 are the same as for embodiment 100 in FIG. 1 and embodiment 200 in FIG. 2. At step 306, the Internet site will ask the Internet user to release their location or share their location via their Internet browser. Because standards such as HTML5 are implemented as part of modern Internet browsers like Firefox™ and Internet Explorer™, it is possible to share the Internet user's wireless location with the Internet sites. For privacy reasons, the Internet user is required to select a "share location" option. Once the Internet user clicks "share location", the Internet site can get the Internet user's wireless location. It is at this moment that the Internet user has provided their consent to release their geographical location, and the site can acquire the Internet user's geographical location and/or the location of said user's computer.

However, that Internet site is not enabled to know if the Internet user is authorized to consent to the release of the location of the communication voice device. For example, a minor may be the Internet user and have the communication voice device. At step 308, the Internet site may check if the Internet user's identity at step 107 matches with the external or internal database. If the information matches such as user/password, billing information, credit card, token number or other secret or private information that the Internet user knows, like private information of the communication voice device owner. Therefore, when the Internet user has provided his/her consent to be located via the browser in step 306, that consent can also be utilized when locating 109 that Internet user via their communication voice device. Should (a) the information not match external or internal databases at Step 107 or (b) when the Internet user did not release his consent at step 306, step 110 is executed and authentication of the transaction can be processed using a different authentication method.

FIG. 4 is a flow chart illustrating the exemplary method and system for acquiring an Internet user's consent to be located and authenticating said Internet user identity using the Internet user location information, according to an embodiment of the present invention. The method starts at step 101 and steps 101 through 105 are the same as for embodiment 100, 200, and 300 in FIG. 1, FIG. 2, and FIG. 3, respectively. At step 306, the Internet site will ask the Internet user to release his/her location or share his/her location via the Internet user's Internet browser. At step 408, the site may determine if the Internet user has released his/her computer location. If the Internet user has released his/her location information, the Internet site will locate the Internet user's communication voice device as well 109. If the Internet user has not released their information, the Internet site will authenticate the transaction using a different method 110.

Another example employs two separate devices with two separate sources of wireless locations, such as a laptop computer and a communication voice device such as a mobile phone. One source of information is the wireless location of the laptop's WiFi, provided by the browser, and the second source of wireless location is the mobile phone's location according to GPS, Cell site or antenna triangulation. Additionally, there could be one device with two separate sources of wireless location, such as a smart phone such as a PDA or iPhone™. Here, it is a single device with the source of information being the WiFi location provided by the browser and the second and separate source of wireless location being the cellular carrier tower triangulation or GPS location provided by the mobile phone carrier.

Many online users with online accounts, such as bank accounts, online gaming and gambling accounts, and e-commerce accounts, and other online users who have Internet accounts protected by a username and password, have provided the institutions and corporations who manage those accounts with contact information that includes a mobile phone number. For these individuals, it is possible to get their consent to be located via their mobile phone by verifying how long their mobile phone has been on record as being associated with that account. If for example, if the mobile phone number has been recorded on a bank's databases and online records for longer than a predetermined time, it is virtually certain that the number does in fact correspond to the user's cell phone, making it unnecessary to verify the association. It is then possible to request the user's consent to be located, without any interaction with the mobile phone during the request and consent processes. Requesting the user's authorization can be done during a user's Internet session, via e-mail, or by otherwise contacting the user and receiving consent. If the mobile phone has been recorded in the bank's databases for less than the predetermined time, then the online bank can verify the mobile phone ownership by using the user's mailing address and mobile phone ownership information, as already mentioned.

Adding geographical locations to the Internet user's information, such as the Internet user's mobile voice device number, mobile voice device location, home address, client locations, etc., will allow verification that the session or connection of the Internet user is authorized. The session or connection IP address origin is matched with the geographical location of the mobile voice device or other geographical location of the user such as the user's home address.

FIG. 5 is a flow chart illustrating one example of a method and system for authenticating an Internet user by validating the identity of the user via geolocation of the user's mobile voice device, IP address or WiFi location. In order to check the current communications the server has, at step 501 the system will monitor the open connections to the server by using a command like "netstat-aon". The command will retrieve information like "Local address" "Foreign address", port, state PID (Process ID) file name etc. Using this information at step 502 the system will be able to determine the open ports and IP address of each open session. Using information from the open session such as IP address, file name etc. it is possible to determine at step 503 who the user is, by matching the IP address against the server's logon logs. The server writes to a log each time a user logs on to the server and the user's IP address, so that it is possible from each log entry to know the username, the time of the user's logon, and whether connection was allowed or denied. It is also possible to build an internal database which will correlate information from the internal server to user information like file name, IP address, username etc.

At step 504 the system will correlate between the username and the user's mobile phone number and check if the user gave his consent or not, if the phone number requires user consent, or if it's a company phone number that does not require user consent. If the phone number is not a company phone number and requires consent then the system will start initiating a consent using one of the methods mentioned above or a different method acceptable by the company employing this method. At step 505 the system locates the user's mobile voice device. It is also possible to install software at the user's mobile voice device, such as a mobile laptop, and that software can transfer using an agent or the computer's browser the laptop location. In addition the system may locate a second independent source of information, such as another independent mobile voice device, to provide additional location information from the independent source. The system can correlate two sources of location information such as Geo IP and mobile voice device, or two independent sources of mobile voice device from two sources. For example, one source can be the WiFi location and the other source can be the carrier information.

At step 506 the system will check if the locations of two sources of information are proximate, within a predetermined degree of separation. (In the example shown in FIG. 5, they are the mobile phone location and the geographic location of the foreign IP address.) If they are, at step 507 the system will authorize the connection. If it's not, at step 508 the system will raise a red flag or alternatively disconnect the session.

One way of doing this is by programming a computer to implement the following steps (see FIG. 5):

1. Use a command such as netstat to identify one or more open sessions into the server, and the foreign IP address of each identified open session.

2. Match the foreign IP address to the server domain or the server security log in order to identify which user name is using this foreign IP address.

3. Once the user name is known, locate the mobile phone number or the address that allows access into the server.

4. Determine the user's mobile phone location or the user's home location.

5. Match the mobile phone location or home location of that user with the open session foreign IP address, then
  (a) If the match is positive, identify the user as an authorized user, or
  (b) If the match is negative, identify the user as an unauthorized user.

There are alternative ways of implementing this method. Suitable embodiments include, without limitation:

Employing a programmed external device which will have access to local or remote username and password databases like the domain server. In addition to the username and password database, the programmed external device will have access to local or remote database of mobile phone numbers associated with the username and password database. Additional databases having geographical locations like clients' locations, home etc. can be associated in the user level or the group level. For example, one may allow user access from the user's home address and/or zip code area (e.g., 375 South End Ave., New York N.Y. 10280) and have a mobile phone associated with that user. When that user tries to access the system, the programmed external device will determine if the request arrives from the correct corresponding home address location (or zip code) and, if not, the system will determine if the request arrived from an IP address and then determine if the user's mobile phone is proximate to (i.e., near or at) the location of that IP address.

The allowable degree of separation between the two locations, beyond which a connection is denied or a session is terminated, is at the discretion of the practitioner, and may be specified any manner that can be implemented on the system (e.g., "no more than x miles", "same or adjacent zip code", "same city", etc.) Group access can be implemented via a client address and/or zip code, i.e., any request from a given address and/or zip code can be allowed. This may be advantageous where authorized users are located within a proprietary building or secure premises.

Additional functions of the programmed external device can be checking that the mobile phone is near or at the allowed address, and/or determining that the mobile phone is near or at the allowed address while the IP address is allowed. The functionality of the programmed external device may be implemented on the server being protected.

There may be various methods for determining distances between the home address, mobile phone location, and IP location. Examples include, without limitation, the following:

1. In case the distance between the home address and the user's (foreign) IP address is more than a predetermined value, and the distance between the user's IP address and the mobile phone location is less than a predetermined value, then allow the connection. Optionally, one may add the foreign IP address to a "white list" of preauthorized users.

2. In case the distance between the home address and the user's (foreign) IP address is less than a predetermined value, and the distance between the user's IP address and the mobile phone location is less than a predetermined value, then allow the connection.

3. In case the distance between the home address and the user's (foreign) IP address is more than a predetermined value, and the distance between the user's IP address and the mobile phone location is more than a predetermined value, then do not allow the connection, stop the connection, or report the breach. Optionally, one may add the foreign IP address to a "black list" of blocked prospective users.

4. In case the distance between the user's (foreign) IP address and the mobile phone location is more than a predetermined value, then do not allow the connection, stop the connection, and/or report the breach. Optionally, one may add the foreign IP address to a "black list" of blocked prospective users.

Preferably, both a white list and a black list of foreign IP addresses is generated automatically by the system, enabling a determination that the user's mobile phone is near a white list IP address at the time of the transaction. In an alternate embodiment, the white list and black list may be created and entered by a system administrator. In another alternate embodiment, the automatically generated black list or white list may be edited by the system administrator to add or delete foreign IP addresses.

Using the "Process ID" it is possible to know which file opens a session or a connection to a remote computer. Since the foreign IP Address is known, the system can determine if the connection is authorized or not authorized. For example, if the foreign IP address is located in Texas while no authorized user is there, access is unauthorized. The present method will be able to flag the connection, inform the system administrator, and allow him to block the connection or allow the connection. In addition, since it's possible to know which file opened the new session or connection, than the method of the present invention can remove the breach-initiating file if it is found to be security hole, Trojan, or Virus. Other options are also possible, such as blocking the outside connection to that IP address, and automatically "black listing" the foreign IP address since that foreign IP address is not near an authorized user's mobile phone device.

Since the system of the present invention can to get the complete communication between the server and the client using tools like sniffers, logs, DLL, etc., and since the system can determine if the connection between the client and the server is authorized based on the foreign IP address and the mobile voice device location, the system can determine which commands the hacker or fraudster sent to the server that gave him unauthorized access into the server. Once the system has determined what commands gave the hacker or fraudster access into the server, the system can block these commands the next time any fraudster or hacker tries to use them. The system blocks these commands by providing a filter on the open service like IIS or in the firewall to automatically block these commands and possibly add the IP address that sent that commands to a "black list".

Each request to connect to the server will pass via the programmed external device or the programmed external device will have the option to monitor existing connections and sessions to the server. In an alternate embodiment, the programmed external device may perform both functions.

In certain embodiments of the invention, additional functionality may be incorporated into the system, including but not limited to the following:

1. Optionally, one may recognize a local subnet and allow connections into the server without checking the mobile phone location at all or during specific hours. For example, if the connection to the server is initiated from a foreign IP address that is located in a safe area then do not check where the mobile location of that user is, or only check the mobile phone location if the connection is during specific hours. Also, one may check the connection into a specific server only if the connection is open and active for more than a predetermined amount of time. For example, when a connection is open from another station for more than 2 hours, then determine if the connection is authorized. One may also determine if the mobile phone is near the foreign IP address only if the connection is made after a specific time of day (e.g., after normal business hours).

2. Optionally, one may check the mobile phone location whenever the user is accessing or requesting specific data that is sensitive, for example if a user is requesting the server to present credit card information, or the credit card information of more than a predetermined number of users.

3. Optionally, if there is a match between the "foreign IP address" and the user IP address as it appears on the security log or domain server, one may elect not to request the mobile phone location of that user.

4. Optionally, one may automatically white list the IP addresses or computer signatures of users who have previously accessed the server and have already had the system check their mobile phone location on previous occasions. The 2nd or 3rd time that the user accesses the server, it will not be necessary to check his mobile phone location.

5. Optionally, since the system will determine which connections are authorized and which are not authorized, the system can also:
   a. Mark unauthorized connections;
   b. Inform the administrator of unauthorized connections;
   c. Show the commands that gave the unauthorized user access into the server;
   d. Block future access into the server using the command patterns that gave the unauthorized user access into the server, so that future access will be blocked automatically when the hacker tries to use the same or similar command pattern;
   e. Automatically block the IP addresses of users who try to gain unauthorized access into the server;
   f. Automatically block the computer signatures of users who try to gain unauthorized access into the server;
   g. Automatically remove files uploaded to the server by unauthorized users; and/or
   h. Automatically disconnect unauthorized connections.

6. Since the system can determine which port an unauthorized user tried to access, the system can allow the system administrator to check only accessed connections and sessions to specific ports.

7. The system will enable the system administrator to build sets of rules to automatically verify if a particular Internet connection is authorized or not authorized.

Systems implementing the methods of the invention can be installed on a server, workstation, laptop, mobile phone, or function as an additional programmed external device between the clients and the server.

In the case that Client A is connected to Client B via messenger, has sent emails, is transferring a file between two computers etc., the system can verify that communication into the server is coming from a computer that is physically near the owner or the user of that computer, or that the user is at the location that the communication is coming from.

By using the methods of the invention, a server can be open to the Internet, and allow authorized users use the server, while providing the server administrator with additional layers of supervision that enable him to stop attacks, from the Internet or locally, as the attack starts or in near time.

A system employing the methods of the invention can work in two main modes, and combinations of the two are possible:

1. Monitoring—the system scans the open sessions and connections and ensures that the connections and sessions open to the server arrive from locations that are near the Internet users' mobile phones.

2. Authentication—in authentication mode, the system ensures that requests to open a session or connection to the server arrive to the server from locations that are near the Internet users' mobile phones.

The difference between monitoring and authentication is that in authentication mode, a system implementing the present invention will not allow access to the server if the request originated from a location where the user's mobile phone is not nearby. Monitoring scans existing connections and sessions to the server after the authentication processes have been passed. In addition, in the monitoring mode, a system implementing the present invention can raise a red flag and/or disconnect an existing connection and the unauthorized connection/session will not be allowed to enter.

In conclusion, herein is presented a method for acquiring an Internet user's consent over the Internet to be geographically located via at least two separate and independent sources of information, wherein at least one independent source of information is the location of said Internet user's wireless communication voice device. The invention is illustrated by examples in the illustrative drawings and in the written description. It should be understood that while adhering to the spirit of the inventive concept, numerous variations exist for the practice of the invention described herein, and that such variations are contemplated as being a part of the present invention.

I claim:

1. A computer-implemented method for acquiring an Internet user's consent to be geographically located, while the user is using a mobile voice device to communicate with a web site, comprising the steps of:
   (a) receiving, via the web site, secret information from the user, while communication between the user's mobile voice device and the web site is over the Internet via WiFi;
   (b) checking whether the secret information matches information associated with the user in a database;
   (c) when the secret information matches the information in the database, asking the user to release the user's mobile voice device geographical location to the web site, via software installed on the mobile voice device;
   (d) in response to the user consent to release of the mobile voice device geographical location, receiving via the web site a first geographical location from said software, wherein the first geographical location is identified via WiFi, and wherein the user releases said geographical location via said software; and
   (e) using at least the response received via the software as the user's consent to request a second geographical location of the user's mobile voice device, wherein the second geographical location is provided by a mobile phone carrier, without requesting a second consent from the user.

2. The method of claim 1, wherein the mobile voice device is a mobile telephone.

3. The method of claim 1, wherein the mobile voice device is a mobile computer.

4. The method of claim 1, wherein the software and the mobile phone carrier provide geographical information for two separate devices.

5. The method of claim 1, wherein the software and the mobile phone carrier provide geographical information for one device.

6. The method of claim 1, wherein the secret information is at least one of the following:
   (a) private information;
   (b) credit card information;
   (c) bank account information;
   (d) a username; and
   (e) a password.

7. The method of claim 1, wherein the database is at least one of the following:
   (a) a database containing mobile phone owner information and maintained by a database provider;
   (b) an internal database maintained by the web site;
   (c) a database containing mobile phone owner information and maintained by the carrier; and
   (d) a database containing mobile phone owner information, wherein such information was previously verified by identifying the owner at a physical location using at least a driver's license.

8. The method of claim 1, further comprising the step of verifying mobile voice device ownership information.

9. The method of claim 1, further comprising the step of verifying that the Internet user is authorized to consent.

10. The method of claim 1, further comprising the step of verifying that the Internet user is not a minor.

11. The method of claim 1, wherein the user releases said geographical location via said software via one single interaction with said software.

12. The method of claim 1, wherein the first geographical location is determined by accessing a database that matches at least one WiFi unique ID with known positions corresponding to such WiFi unique ID.

13. The method of claim 12, wherein said WiFi unique ID is a MAC address.

14. A computer-implemented method for acquiring an Internet user's consent to be geographically located while the user is using a mobile voice device to communicate with a web site, comprising the steps of:
   (a) receiving, via the web site, secret information from the user, while communication between the user's mobile voice device and the web site is over the Internet via WiFi;
   (b) checking whether the secret information matches information associated with the user in a database;
   (c) when the secret information matches the information in the database, asking the user to release the user's mobile voice device geographical location to the web site, via software installed on the mobile voice device;
   (d) in response to the user consent to release of the mobile voice device geographical location, receiving via the web site a first geographical location from said software, wherein the first geographical location is identified via WiFi, and wherein the user releases said geographical location via said software; and
   (e) using at least the response received via the software as the user's consent to request a second geographical location of a second mobile voice device, wherein the second geographical location is provided by a mobile phone carrier, without requesting a second consent from the user, and wherein there is no user interaction with the second mobile voice device.

15. The method of claim 14, wherein the user releases said geographical location via said software via one single interaction with said software.

16. The method of claim 14, wherein the first geographical location is determined by accessing a database that matches at least one WiFi unique ID with known positions corresponding to such WiFi unique ID.

17. The method of claim 16, wherein said WiFi unique ID is a MAC address.

18. A computer-implemented method for acquiring an Internet user's consent to be geographically located, while the user is using a mobile voice device to communicate with a web site, comprising the steps of:

(a) receiving, via the web site, secret information from the user, while communication between the user's mobile voice device and the web site is over the Internet via WiFi;
(b) checking whether the secret information matches information associated with the user in a database;
(c) when the secret information matches the information in the database, asking the user to release the user's mobile voice device geographical location to the web site, via software installed on the mobile voice device;
(d) in response to the user consent to release of the mobile voice device geographical location, receiving via the web site a first geographical location from said software, wherein the first geographical location is identified via WiFi, and wherein the user releases said geographical location via said software; and
(e) using at least the response received via the software as the user's consent to request the geographical location of a second mobile voice device, wherein the geographical location of the second mobile voice device is provided by a mobile phone carrier, without requesting a second consent from the user.

19. The method of claim 18, wherein the user releases said geographical location via said software via one single interaction with said software.

20. The method of claim 18, wherein the first geographical location is determined by accessing a database that matches at least one WiFi unique ID with known positions corresponding to such WiFi unique ID.

21. The method of claim 20, wherein said WiFi unique ID is a MAC address.

* * * * *